United States Patent
Placha

(10) Patent No.: US 9,476,452 B2
(45) Date of Patent: Oct. 25, 2016

(54) TRANSMISSION THRUST WASHER WITH CIRCULATION CIRCUIT

(71) Applicant: FORD GLOBAL TECHNOLOGIES, LLC, Dearborn, MI (US)

(72) Inventor: Diana Placha, Westland, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 595 days.

(21) Appl. No.: 13/772,333

(22) Filed: Feb. 21, 2013

(65) Prior Publication Data

US 2014/0230422 A1 Aug. 21, 2014

(51) Int. Cl.
| | |
|---|---|
| *F16C 17/00* | (2006.01) |
| *F16C 33/02* | (2006.01) |
| *F16H 41/26* | (2006.01) |
| *F16C 43/02* | (2006.01) |

(52) U.S. Cl.
CPC ............... *F16C 33/02* (2013.01); *F16C 17/00* (2013.01); *F16C 43/02* (2013.01); *F16H 41/26* (2013.01); *Y10T 29/49645* (2015.01)

(58) Field of Classification Search
CPC .. F16C 33/106; F16C 33/1065; F16C 33/10; F16C 33/06; F16C 17/04; F16C 17/045; F16C 17/047; Y10T 29/49645
USPC .................... 60/339; 384/121, 123, 368, 420
See application file for complete search history.

(56) References Cited

U.S. PATENT DOCUMENTS

| | | | | |
|---|---|---|---|---|
| 2,362,667 A | * | 11/1944 | Schmidt | F04D 5/001 269/55 |
| 3,495,886 A | * | 2/1970 | Roberts | F16C 17/042 384/420 |
| 4,348,065 A | * | 9/1982 | Yoshioka | F16C 33/1075 384/121 |
| 4,383,771 A | * | 5/1983 | Freytag et al. | 384/121 |
| 5,139,350 A | * | 8/1992 | Gieseler | F16C 17/04 384/295 |
| 5,308,226 A | | 5/1994 | Venkatasubbu | |
| 5,806,987 A | * | 9/1998 | Nose | F16C 17/02 384/100 |
| 5,951,169 A | * | 9/1999 | Oklejas | F16C 17/04 384/123 |
| 6,006,886 A | * | 12/1999 | Sasse et al. | 192/113.5 |
| 6,024,495 A | * | 2/2000 | Loos | F01D 25/168 384/123 |
| 6,394,660 B1 | * | 5/2002 | Butler, III | F16C 19/30 384/620 |
| 6,471,021 B1 | | 10/2002 | Sasse | |
| 6,698,097 B1 | * | 3/2004 | Miura | F16C 17/04 216/43 |
| 6,814,202 B1 | | 11/2004 | Johann | |
| 7,470,064 B2 | * | 12/2008 | Link | F01D 25/168 384/121 |
| 8,021,105 B2 | * | 9/2011 | Ammann | F01D 25/168 384/123 |
| 2004/0076522 A1 | * | 4/2004 | Ochi et al. | 416/204 A |
| 2005/0047690 A1 | * | 3/2005 | Keramati et al. | 384/368 |
| 2007/0144161 A1 | * | 6/2007 | Marathe | F16C 17/04 60/330 |
| 2008/0277222 A1 | * | 11/2008 | Olsen et al. | 192/3.21 |
| 2012/0017579 A1 | * | 1/2012 | Goerend | 60/361 |

OTHER PUBLICATIONS

William R. Ayles, Plastic Composites take to the road, Sep. 1, 2000, Motion System Design.*

* cited by examiner

*Primary Examiner* — Michael Leslie
*Assistant Examiner* — Dustin T Nguyen
(74) *Attorney, Agent, or Firm* — James Dottavio; MacMillan, Sobanski & Todd, LLC

(57) ABSTRACT

An automatic transmission includes: a torque converter; a stator in the torque converter; and a thrust washer adjacent the stator. The thrust washer includes a circulation circuit formed in the washer to facilitate fluid movement from one side of the washer to another side of the washer.

18 Claims, 6 Drawing Sheets

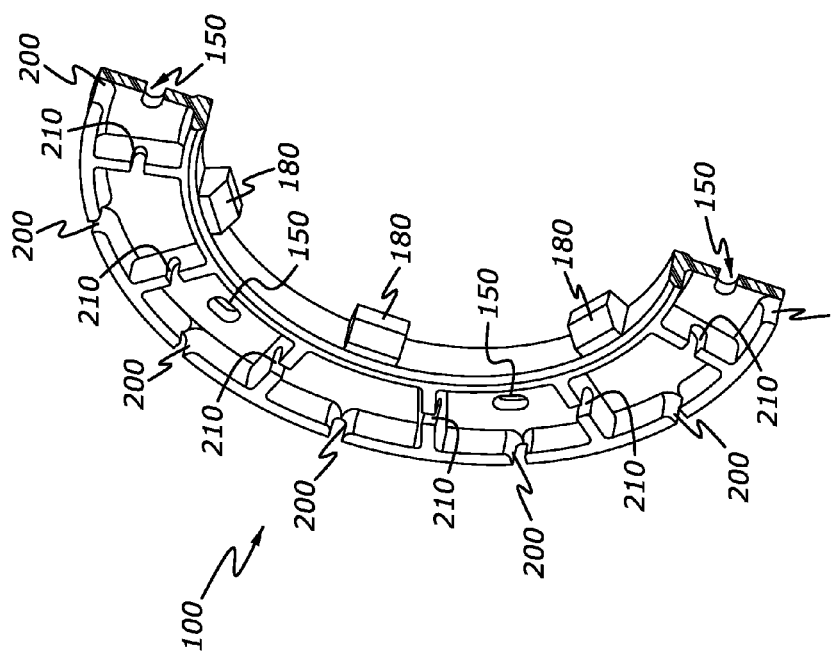

TRANSMISSION THRUST WASHER WITH CIRCULATION CIRCUIT

TECHNICAL FIELD

The present disclosure relates to fluid circulation in vehicle transmissions.

BACKGROUND

Vehicle transmissions require lubrication during operation. Depending upon the performance demands for the transmission, hydraulic fluid can be routed to different sections of the transmissions at different rates. Commonly for automatic transmissions there is a need to facilitate lubrication between a stator for the torque converter and other transmission components. In the past, fairly complicated bearings (e.g., a needle bearing) were primarily employed to reduce friction between the stator and other transmission components. This is a relatively more costly way of mitigating friction in a transmission. Ordinary thrust washers can also reduce friction but needle bearings are still required to the target friction reduction on the stator. See for example U.S. Pat. No. 5,308,266 titled "Variable Stator Vane Assembly for an Axial Flow Compressor of a Gas Turbine Engine." Such parts can also increase the overall weight of the vehicle, thus reducing fuel efficiency.

Therefore, it is desirable to have improved or more cost effective transmission lubrication.

SUMMARY

The present disclosure addresses one or more of the above-mentioned issues. Other features and/or advantages will become apparent from the description which follows.

One advantage of the present disclosure is that it provides a more cost effective way of lubricating a vehicle transmission.

Improved weight reduction is taught with the present disclosure. Lighter weight transmission components also produce greater fuel efficiency.

One exemplary embodiment of the present disclosure relates to an automatic transmission, having: a torque converter; a stator in the torque converter; and a thrust washer adjacent the stator. The thrust washer includes a circulation circuit formed in the washer to facilitate fluid movement from one side of the washer to another side of the washer.

Another exemplary embodiment of the present disclosure relates to a thrust washer for a transmission torque converter, including: a circulation circuit configured to facilitate fluid movement from one side of the washer to another side of the washer. The thrust washer is composed of a composite material.

Another exemplary embodiment of the present disclosure relates to a method of manufacturing a transmission, including: (i) forming a thrust washer composed of composite material; (ii) forming a circulation circuit in the washer to facilitate fluid movement from one side of the washer to another side of the washer; and (iii) assembling a torque converter, including: (a) journaling a stator onto an input shaft; and (b) journaling a thrust washer onto the input shaft, adjacent the stator.

The invention will be explained in greater detail below by way of example with reference to the figures, in which the same reference numbers are used in the figures for identical or essentially identical elements. The above features and advantages and other features and advantages of the present teachings are readily apparent from the following detailed description of the best modes for carrying out the invention when taken in connection with the accompanying drawings. In the figures:

BRIEF DESCRIPTION OF THE DRAWINGS

FIG. 3 is a front view of the thrust washer of FIG. 2a.

FIG. 4 is a cross-sectional perspective view of the thrust washer of FIG. 2a at line 4-4.

FIG. 5 is a rear perspective view of the thrust washer of FIG. 2a.

FIG. 6 is a rear side view of the thrust washer of FIG. 2a.

DETAILED DESCRIPTION

Figure 1:
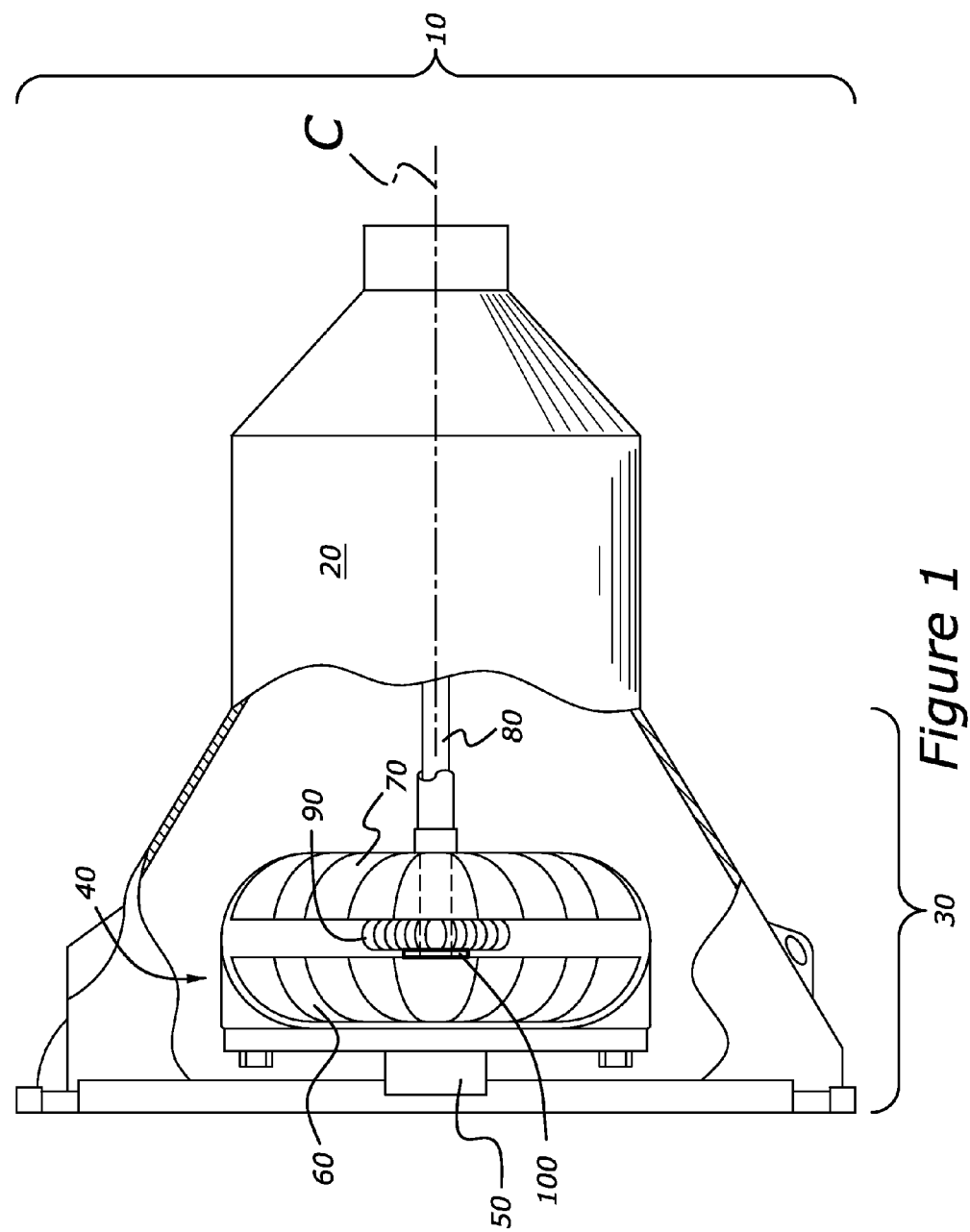
FIG. 1 is a side view of a transmission with torque converter.

Referring to the drawings, wherein like characters represent examples of the same or corresponding parts throughout the several views, there is shown an exemplary vehicle transmission with torque converter having improved lubrication. The illustrated torque converter includes a stator assembly having a thrust washer with circulation circuit formed therein. The circulation circuit facilitates flow of a lubricant, e.g., oil or other fluid, from a center section of the transmission to the stator blades. The shown torque converter also includes weight and fuel savings. A thrust washer included in a stator assembly for the torque converter is composed of lighter weight material.

The teachings of the present disclosure are compatible with different types of vehicle transmissions, especially automatic transmissions. Electrically variable, continuously variable and/or transmissions of any number of speed ranges can employ the present teachings.

Now, with reference to FIG. 1, there is shown therein a partial cross-sectional view of a vehicle transmission 10 compatible with the teachings in the present disclosure. Transmission 10 is an automatic transmission. Transmission housing 20 is shown partially. In the bell housing 30 of the transmission 10 a torque converter 40 is configured to engage an engine crankshaft 50. Torque converter 40 includes a turbine 60 on an engine side of the torque converter 40 and a turbine 70 on a driveline side of the torque converter. Torque converter 40 is journaled onto and splined to an input shaft 80. Input shaft 80 runs along a centerline, C, of the transmission as shown in FIG. 1. Centerline, C, denotes an axial direction of the transmission and subassemblies.

Nested inside of the torque converter 40 is a stator assembly 90 having a thrust washer 100 therein according to the teachings of the present disclosure.

Figure 2A:
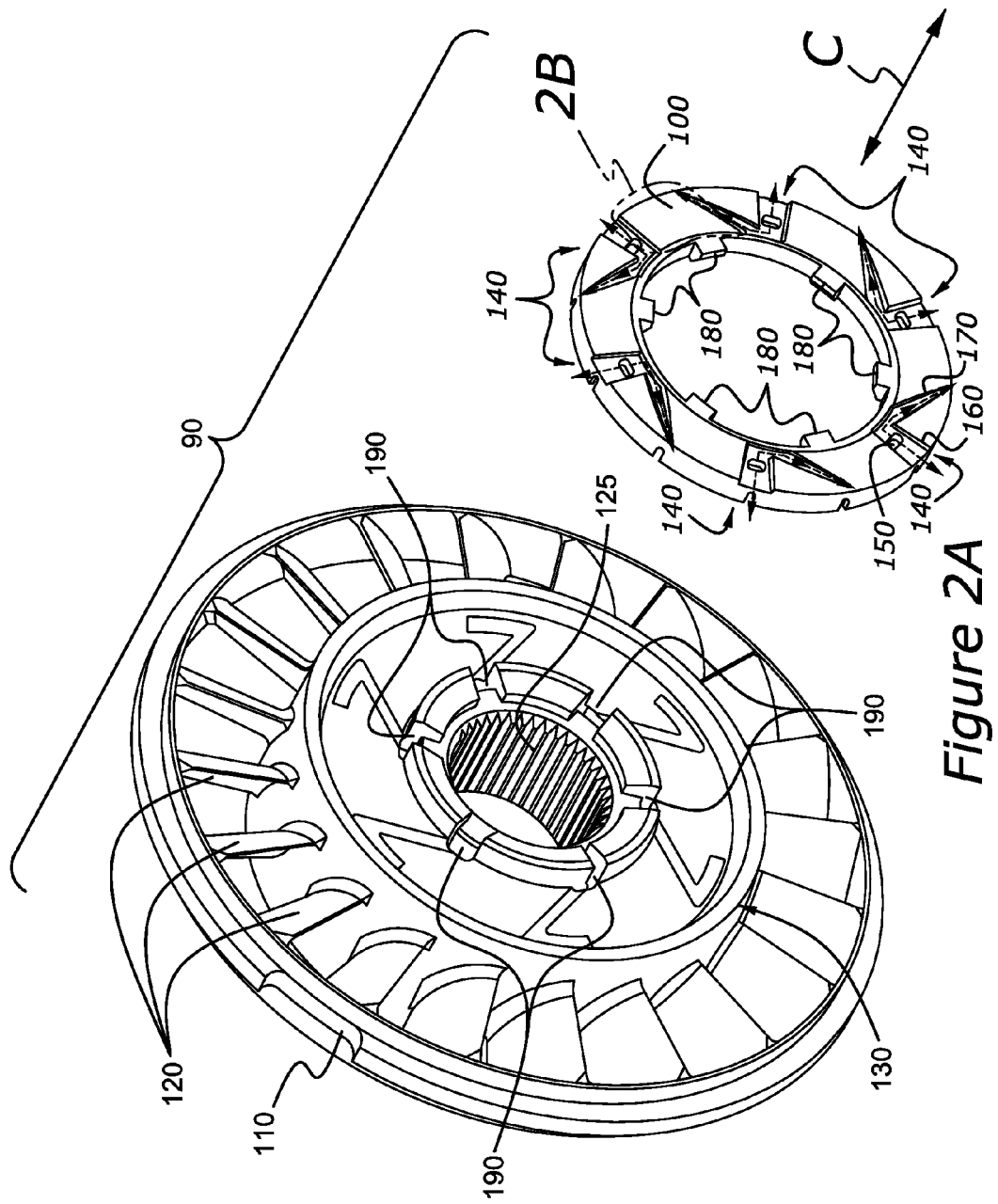
FIG. 2a is an assembly view of the stator and thrust washer of FIG. 1.

In FIG. 2a, the stator assembly 90 of FIG. 1 is shown in assembly view. Stator assembly 90 includes a stator 110 having turbine blades 120 spaced circumferentially throughout an outer circumference of the stator. On an inner circumference of stator 110 a series of splines 125 are formed for attachment to the input shaft (e.g., 80 as shown in FIG. 1). Stator 110 includes a circular recess 130 in the axial direction, into which thrust washer 100 is positionable. Thrust washer 100 rests adjacent stator 110 in recess 130 on engine side of stator.

Figure 2B:
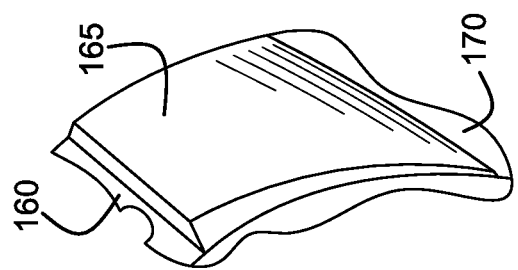
FIG. 2b is a perspective view of a portion of the thrust washer of FIG. 2a at circle 2b.

Thrust washer 100, as shown in FIG. 2a, includes several circulation circuits 140 formed therein. Circulation circuit 140 facilitates oil flow from the input shaft 80 to the stator 110. Circulation circuit 140, in this embodiment, includes an axial orifice 150 formed in thrust washer 100 and two recessed surfaces (or grooves) 160, 170 formed in thrust washer to further facilitate oil flow as discussed hereinbelow with respect to FIG. 3. Adjacent recessed surface 160 is a ramp 165 formed on the face of washer, as shown in FIG. 2b. Ramp 165 is inclined from surface 160 to surface 170. In this embodiment, ramp 165 is thicker proximate to surface 160 and thinner proximate to surface 170. In other embodiments, ramp is inclined in the opposite direction. Ramp 165 assists in forming a film of oil on the face of washer 100. Oil flows, as shown by the arrows, out of orifice 150 and toward an outer circumference of thrust washer 100 and the stator blades 120.

Figure 3:
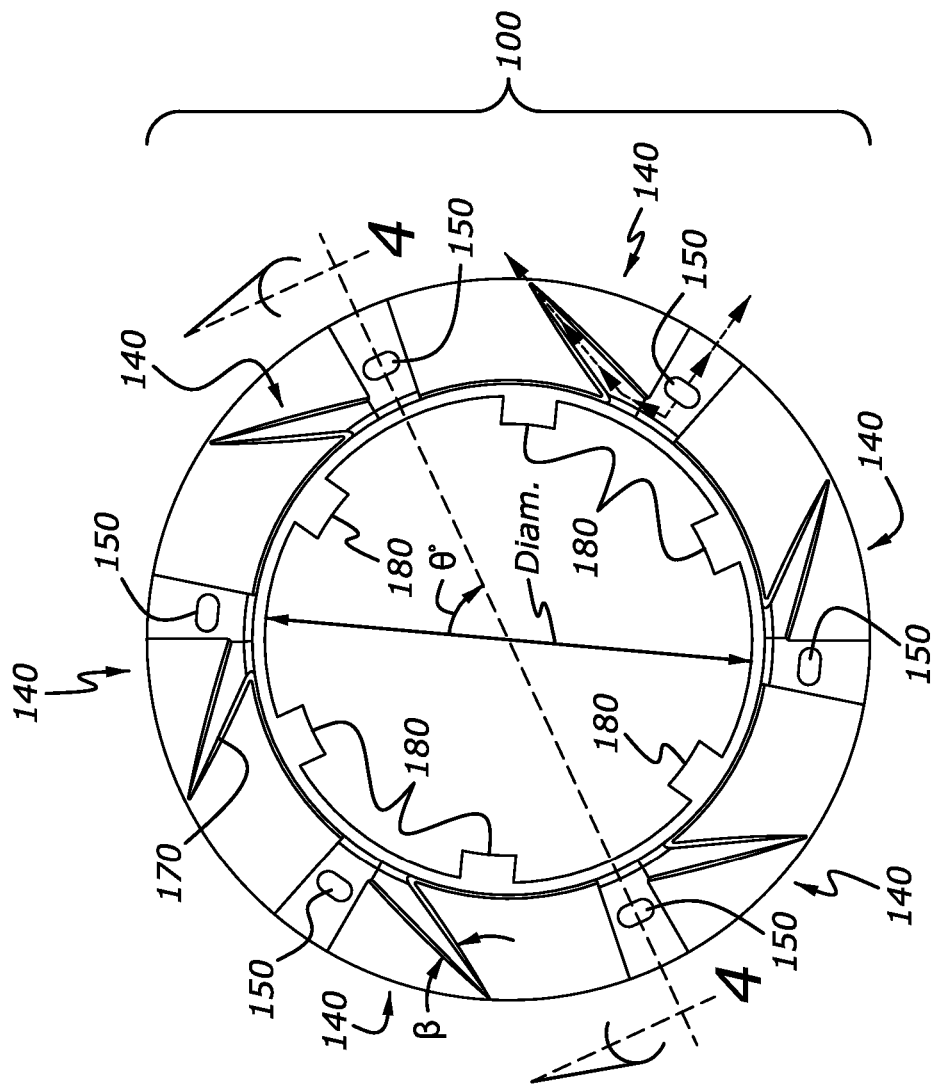

Washer 100, as shown in FIGS. 2a and 3, includes a set of keys 180 formed on an inner circumference. Keys (or key tabs) 180 are compatible with axially extending receptors 190 formed in the inner circumference of stator 110, as shown in FIG. 2a. In the illustrated embodiment six (6) keys 180 are incorporated on the inner circumference of thrust washer 100. In other embodiments, fewer or more compatible keys and receptors can be included on the washer and stator.

FIG. 3 expresses a front view of the washer. As shown in FIG. 3, this embodiment of washer 100 includes six (6) orifices 150 for circulation. Orifices 150 are oblong in shape. Each orifice 150 is positioned in the recessed surfaces 160, 170 of thrust washer. Orifices 150 are circumferentially spaced and separated by an angle of theta, θ. In this embodiment, theta is equal to approximately 60 degrees. Theta can be larger or smaller in other embodiments. Also orifices or recessed surfaces can be of difference sizes or configurations.

Recessed surface 160 on thrust washer, as shown in FIG. 3, is configured in a rectangular configuration and provides a direct flow dead head path to maintain an oil reservoir on the surface of the washer and flow from orifice 150 to an outer circumference of thrust washer 100. Recessed surface 170 presents a narrowing groove having an angular disposition with respect to the diameter (labeled "diam.") of thrust washer 100. The pitch at an outgoing end of recessed surface 170 is represented by beta, β. In this embodiment, beta is equal to approximately 15 degrees.

Figure 5:
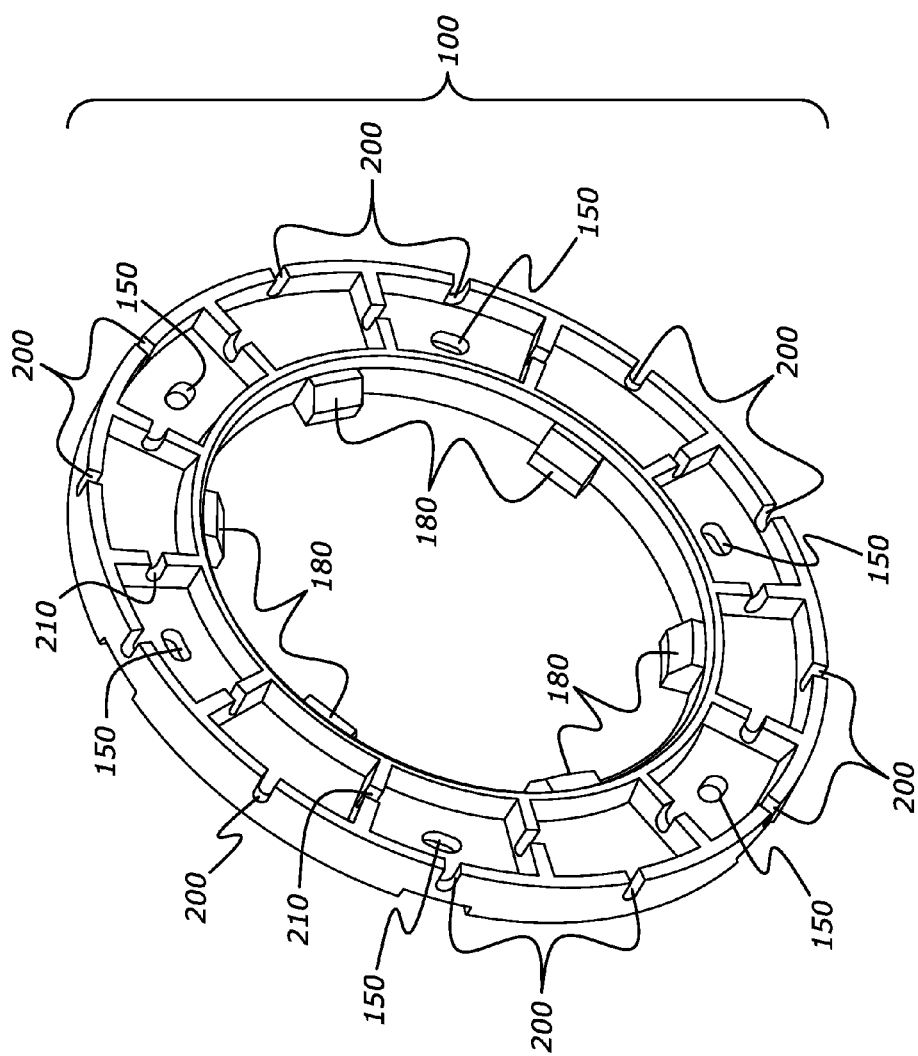
Figure 6:
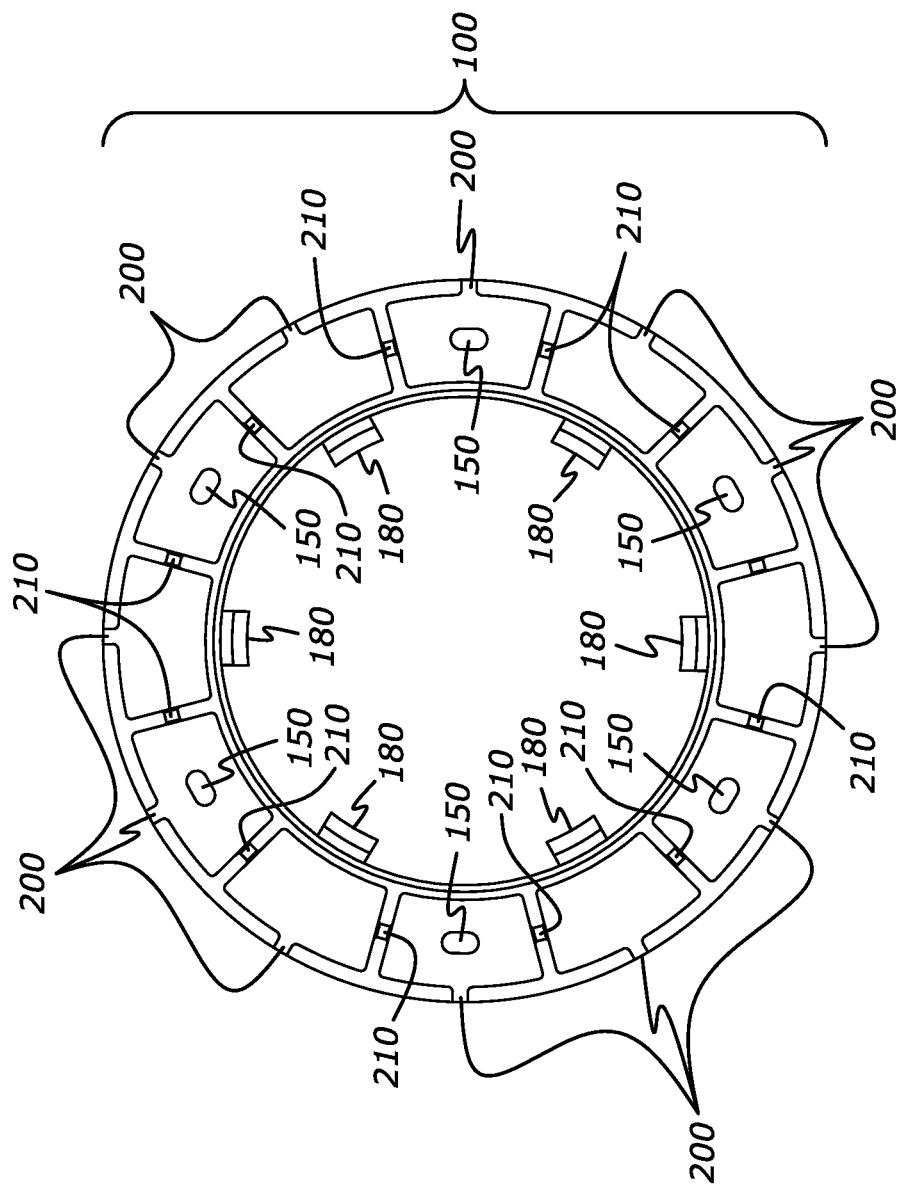

Thrust washer 100 is shown from a driveline side in FIGS. 4-6. FIG. 4 is a cross-sectional view of washer 100 along line 4-4 of FIG. 3. As shown, orifice 150 extends along an axis of washer, e.g., the centerline of the transmission as shown in FIGS. 1 and 2a. FIG. 5 is a full rear perspective view and FIG. 6 is a rear side view of thrust washer 100, with respect to the transmission. Washer 100 provides additional weight and material costs savings as washer includes divots 200 formed along an outer circumference of washer. Divots 200 also support oil flow back to orifice 150 from the engine side of washer 100, as shown in FIG. 3. Divots 200 extend circumferentially with respect to washer and support oil movement from one circuit to another. Oil can also flow in groove 210, as shown in FIG. 4.

In the illustrated embodiment, thrust washer 100 is a molded part composed of a composite, such as for example a polymer. Thrust washer 100 is capable of carrying axial loads placed on the stator 110. Thrust washer 100 is manufactured using an injection molding process. Other manufacturing processes can also be utilized including die casting, stamping or milling, for example. Thrust washer 100 can also be composed of other materials such as light weight metals or metal bearing composites, such as aluminum alloys.

One method of manufacturing a vehicle transmission includes: forming a thrust washer composed of a composite material; forming a circulation circuit in the washer to facilitate fluid movement from one side of the washer to another side of the washer, e.g., as shown in FIGS. 2a-8; and assembling a torque converter, including: journaling a stator onto an input shaft; and journaling a thrust washer onto the input shaft, adjacent the stator.

The method can include forming the circulation circuit with an axial orifice formed in the thrust washer, e.g., 140 as shown in FIGS. 2a and 3. The method can include forming the circulation circuit include forming the axial orifice in an oblong in configuration and forming a recessed surface on a face of the thrust washer, e.g., as discussed with respect to FIGS. 2a-6.

Thrust washer can be any type of annular member configured to journal onto a transmission component such as the input shaft. In some of the different embodiments, thrust washer has different thicknesses. In one embodiment, thrust washer is a bushing. Thrust washer can be a part of a bearing assembly as well. In FIGS. 1-2a, the thrust washer is positioned adjacent the stator, in other embodiments, however, the thrust washer is positioned in a cover assembly for the torque converter.

Those familiar with the art to which this invention relates will recognize various alternative designs and embodiments for practicing the invention within the scope of the appended claims.

I claim:

1. A transmission torque converter, comprising:
   a stator; and
   a thrust washer having a first face facing the stator and an opposed second face, the second face having grooves, including a first set and a corresponding second set, recessed therein and ramps, each ramp extending from a groove in the first set to a groove in the second set, the ramps tapering axially along a circumferential direction, the first set extending radially and each groove in the second set connected to a respective groove in the first set at a radially inner end and extending away at an oblique angle from the groove in the first set.

2. The torque converter of claim 1, including axial orifices extending through the thrust washer between the first and second faces.

3. The torque converter of claim 1, wherein each of the grooves in the second set tapers narrower in width as the groove extends away from the respective groove in the first set.

4. The torque converter of claim 1, wherein the stator includes a circular recess and the thrust washer is nested in the recess and rotationally fixed relative to the stator.

5. The torque converter of claim 4, wherein the first face includes a radially outer circumferential ring and a radially inner circumferential ring defining a recessed pocket between the rings.

6. The torque converter of claim 5, wherein the first face includes radially extending walls extending between the rings, spaced apart about the circumference of the thrust washer.

7. The torque converter of claim 1, wherein the first face includes a radially outer circumferential ring, a radially inner circumferential ring and radially extending walls extending between the rings, spaced apart about the circumference of the thrust washer to define recessed pockets.

8. A thrust washer, comprising:
an axial first face and an opposed second face, the second face having grooves recessed therein and ramps, between the grooves, tapering axially along a circumferential direction, the grooves include a first set extending radially and a corresponding second set, with each groove in the second set connected to a respective groove in the first set at radially inner ends of the corresponding grooves in the first and second sets and the grooves in the second set extending away at an oblique angle from the corresponding groove in the first set; and
axial holes in the grooves.

9. The thrust washer of claim 8, wherein each of the grooves in the second set tapers narrower in width as the groove extends away from the respective groove in the first set.

10. The thrust washer of claim 8, wherein the first face includes a radially outer circumferential ring and a radially inner circumferential ring defining a recessed pocket between the rings, the outer ring including spaced divots to allow for fluid flow through the outer ring.

11. The thrust washer of claim 10, wherein the first face includes radially extending walls extending between the rings, spaced apart about the circumference of the thrust washer.

12. The thrust washer of claim 11, wherein the radially extending walls include divots to allow for fluid flow through the walls.

13. The thrust washer of claim 8, including keys spaced circumferentially about an inner diameter of the thrust washer and extending radially inward.

14. A transmission torque converter, comprising:
a stator; and
a thrust washer having a first face facing the stator and an opposed second face, the second face having grooves recessed therein, and the first face having a radially outer circumferential ring and a radially inner circumferential ring defining a recessed pocket between the rings, the grooves including a first set extending radially and a corresponding second set, with each groove in the second set connected to a respective groove in the first set at a radially inner end and extending away at an oblique angle from the groove in the first set, each of the grooves in the second set tapering narrower in width as the groove extends away from the respective groove in the first set.

15. The torque converter of claim 14, wherein the outer ring includes spaced divots to allow for fluid flow through the outer ring.

16. The torque converter of claim 14, wherein the first face includes radially extending walls extending between the rings, spaced apart about the circumference of the thrust washer, the walls including divots to allow for fluid flow through the walls.

17. The torque converter of claim 14, wherein the stator includes a circular recess and the thrust washer is nested in the recess and rotationally fixed relative to the stator.

18. A transmission torque converter, comprising:
a stator; and
a thrust washer having a first face facing the stator and an opposed second face having grooves recessed therein, the first face having a radially outer circumferential ring, a radially inner circumferential ring and radial walls extending between the rings, spaced apart about the circumference of the thrust washer defining a recessed pockets between the rings, the walls including divots to allow for fluid flow therethrough.

* * * * *